United States Patent [19]
Tyler

[11] Patent Number: 5,318,354
[45] Date of Patent: Jun. 7, 1994

[54] PROPORTIONAL CONTROL VALVE WITH DIFFERENTIAL SENSING AREA

[75] Inventor: Jeffery A. Tyler, Newark, N.Y.

[73] Assignee: C. W. Lisk Company, Inc., Clifton Springs, N.Y.

[21] Appl. No.: 962,969

[22] Filed: Oct. 16, 1992

Related U.S. Application Data

[63] Continuation-in-part of Ser. No. 886,123, May 20, 1992.

[51] Int. Cl.$^5$ .............................. B60T 13/74
[52] U.S. Cl. .............................. 303/3; 303/15; 303/40
[58] Field of Search ............... 303/119.2, 118, 117.1, 303/84.1, 3, 15, 40, 9.66, 9.72, 9.75; 137/627.5, 625.65, 596.17

[56] References Cited

U.S. PATENT DOCUMENTS

| | | |
|---|---|---|
| 2,194,762 | 3/1940 | Maliphant . |
| 2,527,883 | 10/1950 | Ingres et al. . |
| 2,919,162 | 12/1959 | Roberts . |
| 3,525,555 | 8/1970 | Meyer et al. . |
| 3,768,519 | 10/1973 | Morse . |
| 3,857,615 | 12/1974 | Acar . |
| 3,907,379 | 9/1975 | Lawson . |
| 3,924,902 | 12/1975 | Engle . |
| 3,941,428 | 3/1976 | Rothwell et al. . |
| 4,077,674 | 3/1978 | Doto ................... 303/40 |
| 4,145,091 | 3/1979 | Bueler et al. . |
| 4,539,542 | 9/1985 | Clark . |
| 4,557,527 | 12/1985 | Stumpe . |
| 4,604,600 | 8/1986 | Clark . |
| 4,605,197 | 8/1986 | Casey et al. . |
| 4,619,289 | 10/1986 | Tsuru et al. . |
| 4,640,558 | 2/1987 | Nomura et al. . |
| 4,662,605 | 5/1987 | Garcia . |
| 4,773,447 | 9/1988 | Imanaka et al. . |
| 4,778,227 | 10/1988 | Bayliss . |
| 4,821,770 | 4/1989 | Parrott et al. . |
| 4,859,005 | 8/1989 | Rey et al. . |
| 4,860,794 | 8/1989 | Parrott et al. . |
| 4,979,537 | 12/1990 | Offenwanger ............ 137/116.5 |
| 5,015,046 | 5/1991 | Bissell . |
| 5,100,208 | 3/1992 | Angermaier . |
| 5,123,718 | 6/1992 | Tyler . |
| 5,178,441 | 1/1993 | Heibel et al. ............ 303/114.3 |

FOREIGN PATENT DOCUMENTS

| | | |
|---|---|---|
| 0413172 | 2/1991 | European Pat. Off. . |
| 2815735 | 10/1979 | Fed. Rep. of Germany . |
| 3240272 | 5/1984 | Fed. Rep. of Germany . |
| 9202154 | 4/1992 | Fed. Rep. of Germany . |
| 9206872 | 4/1992 | PCT Int'l Appl. . |

OTHER PUBLICATIONS

Advertisement Brochure entitled "MPP/MPZ Electro-Pneumatic Proportional Pressure Regulator Valve," published by Festo Corporation, 1988.

Primary Examiner—Robert J. Oberleitner
Assistant Examiner—Lee W. Young
Attorney, Agent, or Firm—Eugene Stephens & Associates

[57] ABSTRACT

An electrically actuated valve for regulating a working pressure of a closed volume load includes an inlet valve (24) for controlling fluid flow between a supply port (16) and a working port (18) and an outlet valve (26) for controlling fluid flow between the working port (18) and an exhaust port (20). A solenoid actuator (70) applies an adjustable force to a movable valve element (44) for closing the outlet valve (26) and opening the inlet valve (24). The adjustable force is opposed by a reactionary force that is generated by the working pressure. The movable element (44) includes opposing areas exposed to the working pressure for scaling the reactionary force to the working pressure.

36 Claims, 3 Drawing Sheets

PROPORTIONAL CONTROL VALVE WITH DIFFERENTIAL SENSING AREA

RELATED APPLICATIONS

This is a continuation-in-part of copending parent application Ser. No. 886,123, filed May 20, 1992, entitled Proportional Control Valve with Pressure Compensation. The disclosure of this application is hereby incorporated by reference.

TECHNICAL FIELD

My invention relates to proportional control valves and, in particular, to such valves that regulate a working pressure of a closed volume load as a function of a control signal.

BACKGROUND

Proportional control valves include actuators that apply an adjustable force to a directional control valve connecting a closed volume load with both supply and exhaust fluid flow paths. The directional control valve reacts to the adjustable force by directing fluid through one of the two fluid flow paths until an equilibrium is reached with a reactionary force applied by the working pressure. For example, when the adjustable force is greater than the reactionary force, the supply path is opened and the exhaust path is closed. Conversely, when the adjustable force is less than the reactionary force, the supply path is closed and the exhaust path is opened. However, both paths are closed when the two forces are equal.

One way of generating the adjustable force is by applying a pilot pressure to one face of a piston that operates the valve. The reactionary force is generated by applying the working pressure to an opposing face of the piston. The piston is movable in opposite directions by differences between the pilot and working pressures and is balanced against movement when the two pressures are equal.

However, the pilot pressure itself is difficult to accurately regulate and limits the response time of proportional control valves for varying the working pressure, especially when the source of pilot pressure is located at a distance from the proportional control valve. Some uses for proportional control valves require much faster response times. For example, anti-lock braking systems require faster response times including pulsed responses to maintain maximum braking force over varying traction conditions without significant wheel skid.

U.S. Pat. No. 2,194,762 to Maliphant discloses an early attempt to replace pilot pressure with a solenoid actuator to regulate brake pressure. The solenoid actuator applies an adjustable force against a piston that isolates a working pressure of a brake cylinder from an exhaust pressure. In other words, the adjustable force applied by the solenoid actuator is opposed by a reactionary force applied by the working pressure against the piston. The piston has a very large area exposed to the working pressure, and the solenoid must be very large to match reactionary forces corresponding to a range of working pressures. In addition, a valve seating force generated by a supply pressure also opposing the adjustable force distorts the valve's performance.

U.S. Pat. No. 4,557,527 to Stumpe and U.S. Pat. No. 5,015,046 to Bissell disclose more recent examples of proportional control valves which supplement pilot pressures with electromagnetic actuators for regulating braking pressure. However, Stumpe's electromagnetic actuator has just two excited positions that are selected by an electronic circuit on the basis of a signal provided by a remote pressure sensor. Bissell's actuator is a stepper motor combined with a threaded thrust member and a spring for converting rotary positions of the motor into predetermined forces against a piston. Pilot pressure is also applied to the piston. Therefore, both a measurement of the pilot pressure and a summing calculation are required to determine the total adjustable force against the piston. In addition, the piston has a very large area exposed to the working pressure, and a correspondingly large amount of electrical power is required to move the piston with the stepper motor against the reactionary forces.

My U.S. Pat. No. 5,123,718 discloses a proportional control valve that regulates brake pressure proportional to an adjustable force applied by a solenoid actuator. A directional control valve connecting a brake to both supply and exhaust fluid flow paths is made up of an inlet valve that regulates a flow of fluid from a supply port to a working (delivery) port, and an outlet (control) valve that regulates a flow of fluid from the working port to a primary exhaust port.

The solenoid actuator of my prior valve is sized to apply an adjustable force proportional to a predetermined range of working pressures applied over an area enclosed by a seat of the outlet valve. A product of the working pressure and the area of the outlet valve seat is equal to a reactionary force that opposes the adjustable force. An outlet valve poppet attached to the solenoid actuator is urged by the adjustable force in a first direction for opening the inlet valve and closing the outlet valve and is urged by the reactionary force in a second direction for closing the inlet valve and opening the outlet valve.

The area enclosed by the outlet valve seat is limited to reduce the size of the solenoid that is required to match the reactionary forces. However, the limited area of the outlet valve seat also restricts the rate of fluid flow along the exhaust path to the primary exhaust port. Accordingly, a separate exhaust path is provided through a dump valve to a secondary exhaust port for discharging higher rates of fluid flow. In addition, a vent valve is used to distinguish between high and low rates of fluid flow for controlling operation of the dump valve.

SUMMARY OF INVENTION

My invention provides for regulating a working pressure of a closed volume load proportional to an adjustable force generated exclusively by an electromagnetic actuator. A reactionary force generated by the working pressure in opposition to the adjustable force is limited in magnitude to reduce the size and power requirements of the electromagnetic actuator. This is accomplished without restricting or dividing an exhaust flow path through the valve.

One example of my invention includes two fluid conduits and a directional control valve for regulating fluid flow through the two conduits. A first of the two conduits connects a supply port to a working port for increasing working pressure of a closed volume load, and a second of the two conduits connects the working port to an exhaust port for decreasing the working pressure of the closed volume load. The directional valve includes an outlet valve seat having a predetermined area for passing fluid through the second conduit.

An electromagnetic actuator generates an adjustable force in response to a control signal for operating the directional control valve. A poppet assembly of the directional control valve is moved by the adjustable force in a first direction for opening the first conduit and closing the second conduit and is moved in a second direction by a reactionary force generated by the working pressure for closing the first conduit and opening the second conduit.

The poppet assembly includes first and second sensing areas over which the reactionary force is generated by the working pressure. However, the working pressure applied to the first sensing area urges the poppet assembly in the first direction, whereas the working pressure applied to the second sensing area urges the poppet assembly in the second direction. The second sensing area of the poppet assembly is larger than the first sensing area by a difference that is less than the predetermined area of the outlet valve seat for scaling the reactionary force in a predetermined proportion to the working pressure. The limited size of the differential sensing area of the poppet assembly reduces the size requirements of the electromagnetic actuator without restricting fluid flow rates through the outlet valve seat.

However, either of the first and second sensing areas of the poppet assembly can be made equal to the predetermined area of the outlet valve seat. For example, the second sensing area can be formed by an outlet valve poppet that isolates the working pressure from an exhaust pressure within the second conduit. The smaller first sensing area can be formed by a fluid counterbalance having a first face exposed to the working pressure and a second face exposed to the exhaust pressure. The fluid counterbalance is connected to the outlet valve poppet for urging the outlet valve poppet in the second direction. The resulting reactionary force on the outlet valve poppet has a magnitude that is less than a product of the predetermined area of the outlet valve seat and the working pressure.

Alternatively, the outlet valve poppet can be sized equal to the first sensing area of the poppet assembly for isolating the working pressure from the exhaust pressure. The larger second sensing area can be formed by an extended portion of the outlet valve poppet enclosed by a seal for also isolating the working pressure from the exhaust pressure. However, the second sensing area is less than two times larger than the first sensing area for similarly limiting the magnitude of the reactionary force.

DRAWINGS

DETAILED DESCRIPTION

Figure 1:
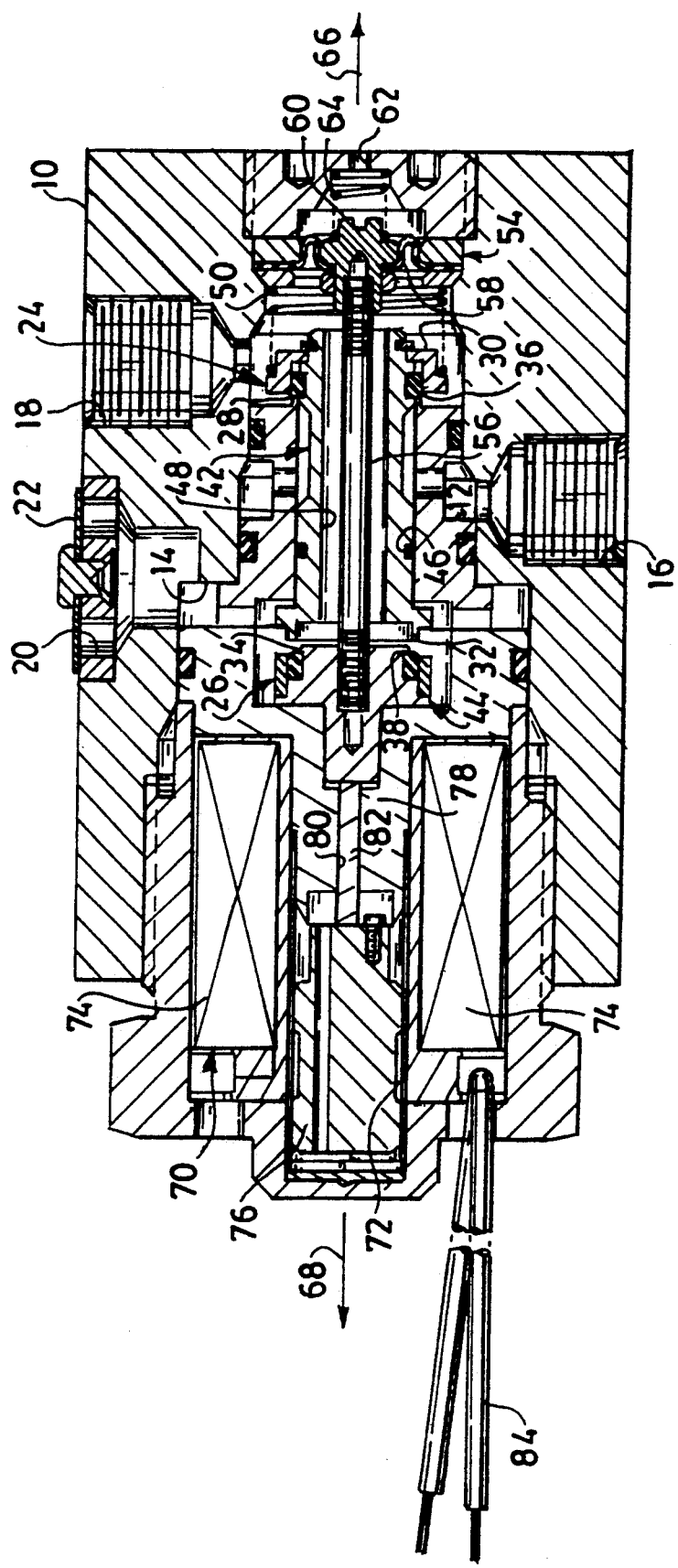
FIG. 1 is a cross-sectional view of one example of my new proportional control valve.

My proportional control valve depicted in FIG. 1 has a housing 10 within which first and second conduits 12 and 14 are formed as passages. The first conduit 12 provides a fluid flow path from a supply port 16 to a working port 18. The second conduit 14 provides a fluid flow path from the working port 18 to an exhaust port 20. A flapper valve 22 protects the exhaust port 20 from contamination.

Fluid flowing through the first and second conduits 12 and 14 is regulated by a directional control valve made up of an inlet valve 24 and an outlet valve 26. The inlet valve 24 interrupts the fluid flow through the first conduit 12 for isolating a supply pressure from a working pressure. The outlet valve 26 interrupts the fluid flow through the second conduit 14 for isolating the working pressure from an exhaust pressure.

The inlet and outlet valves 24 and 26 are seating action valves. The inlet valve 24 has a seat 28 enclosing a predetermined area of the fluid flow path within the first conduit 12 and a poppet 30 for obstructing fluid flow through the inlet valve seat 28. Similarly, the outlet valve 26 has a seat 32 enclosing a predetermined area of the fluid flow path within the second conduit 14 and a poppet 34 for obstructing fluid flow through the seat 32. Axial O-ring seals 36 and 38 carried on respective shoulders of the inlet and outlet valve poppets 30 and 34 provide for seating the inlet and outlet valve poppets 30 and 34 against the inlet and outlet valve seats 28 and 32.

The inlet and outlet valves 24 and 26 are interrelated by a poppet assembly having first and second relatively movable elements 42 and 44. The first movable element 42 incorporates both the inlet valve poppet 30 and the outlet valve seat 32. The second movable element 44 incorporates the outlet valve poppet 34. The inlet valve seat 28 is formed within the housing 10.

The first movable element 42 is preferably balanced against movement imparted by both the supply pressure and the working pressure. However, some small imbalances due to normal tolerancing and design practices can be accommodated, especially such imbalances that bias the inlet valve into a default position. For example, the first movable element 42 is preferably balanced to the supply pressure by equating the predetermined area enclosed by the inlet valve seat 28 with a cross-sectional area of the first movable element 42 enclosed by a radial 0-ring seal 46. However, the cross-sectional area enclosed by the radial seal 46 can be slightly larger than the predetermined area enclosed by the inlet valve seat 28 to assure proper seating of the inlet valve poppet 30.

The first movable element 42 is also preferably balanced to the working pressure by equating the predetermined area enclosed by the inlet valve seat 28 with the predetermined area enclosed by the outlet valve seat 32. A passage 48 within the first movable element 42 communicates the working pressure between an exterior of the inlet valve axial seal 36 and an interior of the outlet valve axial seal 38. However, the predetermined area enclosed by the inlet valve seat 28 should not be less than the predetermined area enclosed by the outlet valve seat 32 to again assure proper seating of the inlet valve poppet 30. An upper spring 50 also biases the inlet valve 24 into a closed position.

In contrast, the second movable element 44 is imbalanced to the working pressure for generating a reactionary force proportional to the working pressure. The second movable element incorporates, in addition to the outlet valve poppet 34, a fluid counterbalance in the form of a diaphragm assembly 54 that is connected to the outlet valve poppet 34 with a rod 56. The diaphragm assembly 54 has a first face 58 exposed to the working pressure and a second face 60 exposed to ambient (i.e., atmospheric) pressure through a vent port 62. Alternatively, the vent port 62 can be connected within the housing 10 to the exhaust port 20 to compensate for any differences between the exhaust and ambient pressures. A lower spring 64, acting through the diaphragm assembly 54 and rod 56, biases the outlet valve 26 into an open position.

The first face 58 of the diaphragm assembly forms a first sensing area exposed to the working pressure for urging the second movable element 44 in a first direction 66 for closing the outlet valve 26 and opening the inlet valve 24. However, the outlet valve poppet 34, which is exposed to the working pressure over the predetermined area of the outlet valve seat 32, forms a second sensing area for urging the second movable element 44 in a second direction 68 for opening the outlet valve 26. The second sensing area defined by the outlet valve poppet 34 is larger than the first sensing area defined by the first face 58 of the diaphragm assembly for generating a reactionary force in the second direction 68 proportional to the working pressure.

The reactionary force can be scaled to the working pressure independent of the size of the outlet valve seat 32 by adjusting the relative sizes of the first and second sensing areas. However, a difference between the first and second sensing areas is preferably less than the predetermined area of the outlet valve seat 32 so that the reactionary force has a magnitude that is less than a product of the predetermined area of the outlet valve seat 32 and the working pressure.

An electromagnetic actuator is formed as a proportional solenoid 70 having a core 72 surrounded by a coil 74. An armature 76 is guided for movement along the core 72 with respect to a pole piece 78. A bore 80 formed through the pole piece 78 guides a stem 82 that connects the armature 76 to the outlet valve poppet 34 of the second movable element. Wires 84 convey an electric current to the coil 74 for generating an adjustable force between the armature 76 and the pole piece 78 proportional to the electric current.

The adjustable force of the proportional solenoid 70 moves the second movable element 44 in the first direction 66 for closing the outlet valve 26 and opening the inlet valve 24. However, initial movement of the second movable element 44 is opposed by a small biasing force applied by the lower spring 64. Once the small biasing force of the lower spring 64 has been overcome by a first threshold force applied by the solenoid 70, the second movable element 44 can be moved in the first direction for seating the outlet valve poppet 34 against its seat 32.

Further movement of the second movable element 44, together with the first movable element 42, is opposed by another small biasing force applied by the upper spring 50. Accordingly, a second threshold force must be applied by the solenoid 70 to initially lift the inlet valve poppet 30 off of its seat 28. Adjustable forces above the second threshold force are used to regulate the working pressure.

Fluid flow through the inlet valve between the supply port 16 and the working port 18 increases the working pressure. The reactionary force generated by the working pressure against the second movable element 44 opposes the adjustable force applied by the solenoid 70 against the same movable element. Accordingly, the working pressure is increased until the corresponding reactionary force is sufficient to overcome the adjustable force and thereby move the second movable element 44 in the second direction 68 for reseating the inlet valve poppet 30 against its seat 28.

When the adjustable and reactionary forces are so balanced, a constant working pressure is maintained. However, if the adjustable force is reduced, the reactionary force lifts the outlet valve poppet 34 off of its seat 32 for permitting fluid flow through the outlet valve 26 between the working port 18 and the exhaust port 20. The working pressure is decreased until the corresponding reactionary force is sufficiently overcome by the remaining adjustable force to move the second movable element 44 in the first direction 66 for reseating the outlet valve poppet 34 against its seat 32.

Figure 2:
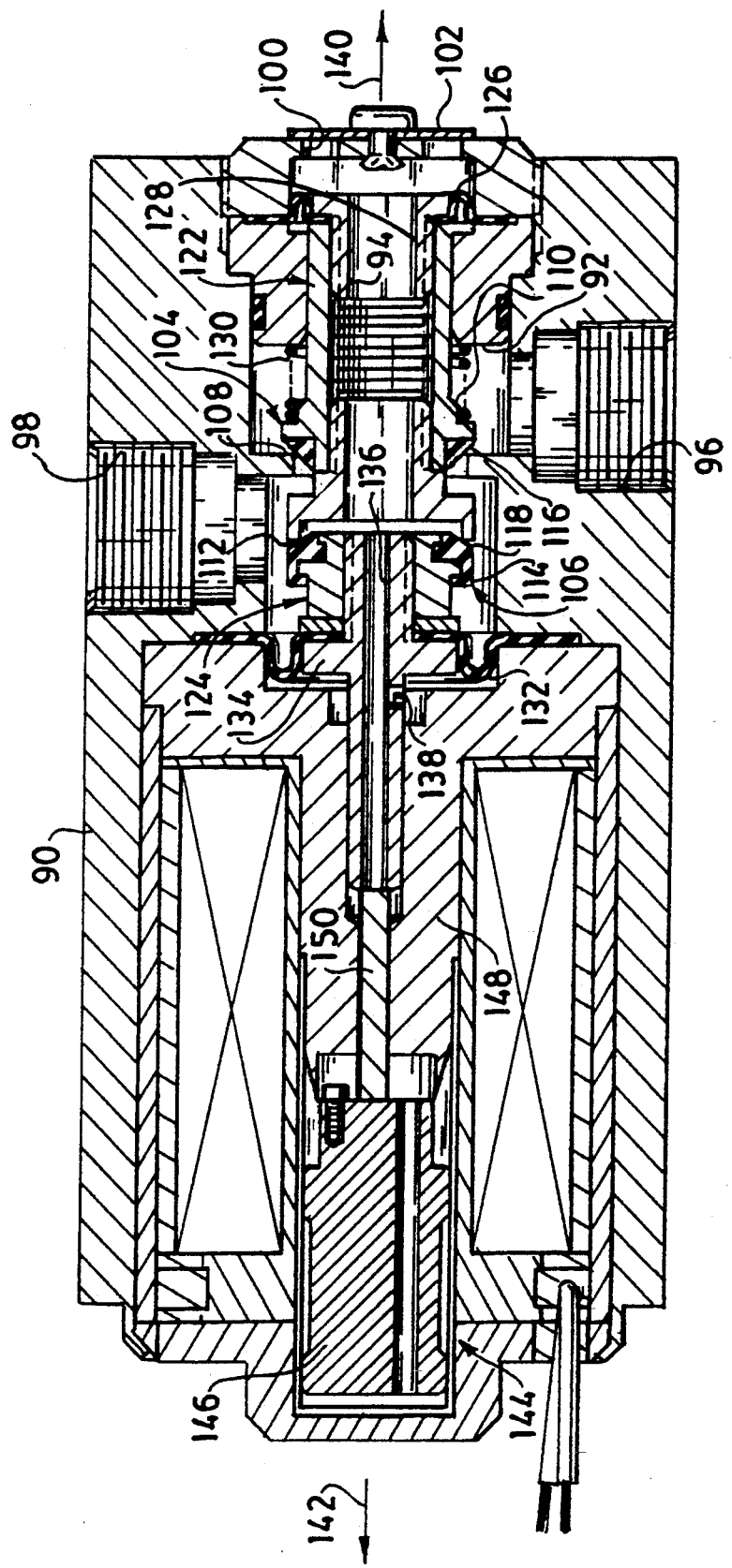
FIG. 2 is a cross-sectional view of another example of my new proportional control valve.

Another example of my proportional control valve depicted in FIG. 2 has several features in common with my prior example including a housing 90 enclosing a first conduit 92 and a second conduit 94. The first conduit 92, which is interrupted by an inlet valve 104, connects a supply port 96 to a working port 98. The second conduit 94, which is interrupted by an outlet valve 106, connects the working port 98 to an exhaust port 100. A flapper valve 102 covers the exhaust port 100.

Also similar to the preceding example, the inlet and outlet valves 104 and 106 are interrelated by a poppet assembly that includes first and second movable elements 122 and 124. The first movable element 122 incorporates a poppet 110 of the inlet valve and a seat 112 of the outlet valve. The second movable element 124 incorporates a poppet 114 of the outlet valve. A seat 108 of the inlet valve is formed in the housing 90. The inlet and outlet valve poppets 110 and 114 carry respective axial seals 116 and 118 for seating the poppets against their respective seats 108 and 112.

A first radial diaphragm seal 126 encloses a cross-sectional area of the first movable element 122 for isolating a supply pressure at the supply port 96 from an exhaust pressure at the exhaust port 100. The inlet valve seat 108 encloses a predetermined area of the first conduit 92 and, together with the inlet valve poppet 110, isolates the supply pressure from a working pressure at the working port 98. The outlet valve seat 112 encloses a predetermined area of the second conduit 94 and, together with the outlet valve poppet 114, isolates the working pressure from the exhaust pressure.

The cross-sectional area of the first movable element 122 enclosed by the radial seal 126 is at least approximately equal to the predetermined area enclosed by the inlet valve seat 108 for balancing the first movable element to the supply pressure. The predetermined areas enclosed by the inlet and outlet valve seats 108 and 112 are also approximately equal for balancing the first movable element 122 to the working pressure. A first passage 128 communicates the exhaust pressure between the equal areas enclosed by the first radial seal 126 and the outlet valve seat 112. A spring 130 biases the inlet valve poppet 110 against its seat 108.

A second radial diaphragm seal 132 encloses a cross-sectional area of the second movable element 124 within an extended portion 134 of the outlet valve poppet 114. The second radial seal 132 isolates the working pressure from the exhaust pressure and is sized with respect to the outlet valve seat 112 for imbalancing the second movable element to the working pressure. A second passage 136, along with a vent 138, is formed in the second movable element 124 for communicating the exhaust pressure between the outlet valve poppet 114 and the exhaust side of the second radial seal 132. Although not shown, a second spring could be used to bias the outlet valve 106 to an open position.

The outlet valve poppet 114 forms a first sensing area, equivalent to the predetermined area of the outlet valve seat 112, over which the working pressure is applied for urging the second movable element 124 in a first direction 140 for closing the outlet valve 106 and opening the inlet valve 104. The second radial seal 132 encloses a larger second sensing area over which the working pressure is applied for urging the second movable element in a second direction 142 for opening the outlet valve 106.

A reactionary force in the second direction 142 is generated as a product of the working pressure and a difference between the first and second sensing areas. Accordingly, the reactionary force can be scaled to the working pressure by adjusting the relative sizes of the first and second sensing areas. However, the reactionary force is preferably limited in magnitude by limiting the size of the second sensing area to no more than two times the size of the first sensing area so that the magnitude of the reactionary force is less than a product of the predetermined area of the outlet valve seat 112 and the working pressure.

A proportional solenoid 144, similar to the proportional solenoid of the preceding example, generates an adjustable force in the first direction 140 as a function of a control signal. The adjustable force, which is generated as an attractive force between an armature 146 and a pole piece 148, is transmitted by a stem 150 to the second movable element 124. The relative magnitudes of the adjustable and reactionary forces determine the operating positions of the inlet and outlet valves 104 and 106 similar to the preceding example.

Figure 3:
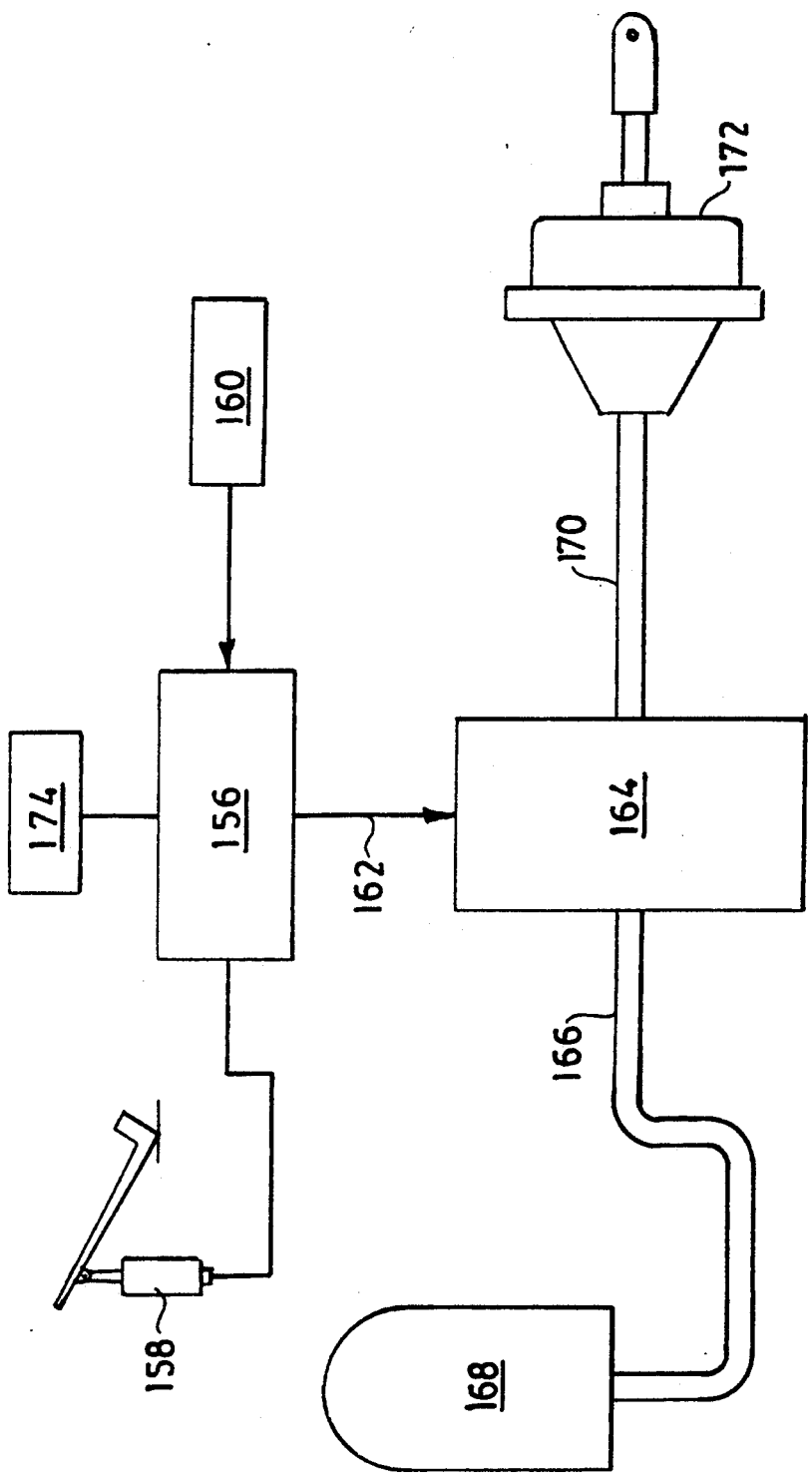
FIG. 3 is a diagram showing how either example of my proportional control valve can be incorporated into an electronic braking system.

FIG. 3 depicts how either example of my proportional control valve can be incorporated into an electronic braking system. The depicted system includes a controller 156 that receives information concerning desired braking performance from sensor 158 (e.g., a brake pedal transducer) and actual braking performance from one or more sensors 160 (e.g., wheel speed sensors) and outputs a control signal 162 to my proportional control valve 164.

A supply line 166 conducts flows of air at a supply pressure from a source of pressurized air 168 to my control valve 164. A working line 170 conducts flows of air at working pressures between my control valve 164 and a brake cylinder 172. My control valve 164 regulates the working pressure as a function of the control signal 162.

A source of electrical power 174 is connected to the controller 156 having sufficient power for operating one or more of my control valves 164. Although most automotive vehicles generate their own electrical power during use, the reactionary forces opposing movement of my electromagnetic actuators are scaled so that my control valve 164 will operate properly using a vehicle battery as a sole source of electrical power. This feature enables the brakes to operate even if the vehicle is turned off or stalls.

Although my valve has been described for use in a braking system, my valve is also useful for other applications requiring pressure control. For example, my valve can be used to operate variable geometry turbochargers or to control positions of spring biased cylinders.

I claim:

1. A proportional control valve for controlling a working pressure in a closed volume load comprising:

a first conduit connecting a supply port to a working port for increasing the working pressure of the closed volume load;

a second conduit connecting said working port to an exhaust port for decreasing the working pressure of the closed volume load;

a directional control valve for regulating fluid flow through said first and second conduits;

an outlet valve seat of said directional control valve having a predetermined area for passing fluid through said second conduit;

an electromagnetic actuator for generating an adjustable force in response to a control signal for operating said directional control valve;

a poppet assembly of said directional control valve being movable by the adjustable force in a first direction for opening said first conduit and closing said second conduit and being movable in a second direction by a reactionary force generated by the working pressure for opening said second conduit;

said poppet assembly including a first area over which the working pressure is applied for moving said poppet assembly in said first direction and a second area over which the working pressure is applied for moving said poppet assembly in said second direction; and said second area of said poppet assembly being larger that said first area by a difference that is less than said predetermined area of the outlet valve seat for scaling the reactionary force as a predetermined proportion of the working pressure.

2. The valve of claim 1 in which said second area of the poppet assembly is equal to said predetermined area of the outlet valve seat.

3. The valve of claim 2 in which said second area of said poppet assembly is formed by an outlet valve poppet that isolates said working pressure from an exhaust pressure within said second conduit.

4. The valve of claim 3 in which said first area of said poppet assembly is formed by a fluid counterbalance having a first face exposed to the working pressure and a second face exposed to the exhaust pressure.

5. The valve of claim 4 in which a rod connects said fluid counterbalance to said outlet valve poppet.

6. The valve of claim 1 in which said first area of the poppet assembly is equal to said predetermined area of the outlet valve seat.

7. The valve of claim 6 in which said first area of the poppet assembly is formed by an outlet valve poppet that isolates the working pressure from an exhaust pressure within said second conduit.

8. The valve of claim 7 in which said second area of the poppet assembly is formed by an extended portion of said outlet valve poppet enclosed by a seal that also isolates the working pressure from the exhaust pressure.

9. The valve of claim 8 in which a passage is formed through said poppet assembly for equating the exhaust pressure isolated by said outlet valve poppet with the exhaust pressure isolated by a seal enclosing an extended portion of the outlet valve poppet.

10. The valve of claim 1 in which said directional control valve includes an inlet valve seat having a predetermined area for passing fluid through said first conduit.

11. The valve of claim 10 in which said poppet assembly is formed in part by first and second relatively movable elements of said directional control valve for separately controlling the fluid flow through said first and second conduits.

12. The valve of claim 11 in which said first movable element incorporates an inlet valve poppet that is aligned with said inlet valve seat for controlling the fluid flow through said first conduit, and said second movable element incorporates an outlet valve poppet that is aligned with said outlet valve seat for controlling the fluid flow through said second conduit.

13. The valve of claim 12 in which said first movable element also incorporates said outlet valve seat for movement together with said inlet valve poppet.

14. The valve of claim 13 in which said first movable element is mechanically biased for movement in said second direction.

15. The valve of claim 14 in which said actuator is connected to said second movable element for moving said first and second movable elements in said first direction.

16. The valve of claim 15 in which said actuator is a proportional solenoid for generating the adjustable force proportional to an electrical signal applied as the control signal to the actuator.

17. An electrically actuated valve for regulating a working pressure of a closed volume load as a function of an electrical signal comprising:
an inlet valve interrupting a first flow path from a supply port to a working port for isolating a supply pressure from the working pressure and having a seat enclosing a predetermined area of said first flow path;
an outlet valve interrupting a second flow path from said working port to an exhaust port for isolating the working pressure from an exhaust pressure and having a seat enclosing a predetermined area of said second flow path;
a first movable element for opening and closing said inlet valve;
a second movable element for opening and closing said outlet valve;
an actuator responsive to the electrical signal for applying an adjustable force against said first and second movable elements in a first direction for closing said outlet valve and opening said inlet valve;
said second movable element including a first area over which the working pressure is applied for urging said second movable element in said first direction for closing said outlet valve and opening said inlet valve and a second area over which the working pressure is applied for urging said second movable element in a second direction for opening said outlet valve; and
said first and second areas of the second movable element being related in size for opposing movement of said actuator in said first direction with a reactionary force having a magnitude that is less than a product of said predetermined area of the outlet valve seat and the working pressure.

18. The valve of claim 17 in which said first and second areas of the second movable element are enclosed by respective seals for isolating the working pressure from the exhaust pressure.

19. The valve of claim 18 in which said outlet valve includes a poppet formed as a part of said second movable element for closing said outlet valve, and one of said respective seals enclosing areas of the second movable element is supported on said outlet valve poppet.

20. The valve of claim 19 in which said one seal supported on the outlet valve poppet encloses said second area of the second movable element over which the working pressure is applied for moving said second movable element in said second direction for opening said outlet valve.

21. The valve of claim 20 in which an other of said respective seals enclosing areas of the second movable element encloses said first area of the second movable element over which the working pressure is applied for moving said second movable element in said first direction for closing said outlet valve and opening said inlet valve.

22. The valve of claim 21 in which said first area of the second movable element is smaller than said second area of the second movable element for limiting said magnitude of the reactionary force opposing movement of the actuator.

23. The valve of claim 22 in which said second area of the second movable element is equal to said predetermined area of the outlet valve seat.

24. The valve of claim 17 in which said first area of said second movable element is formed by a fluid counterbalance having a first face oriented for exposure to the working pressure and a second face oriented for exposure to the exhaust pressure.

25. The valve of claim 24 in which said second area of said second movable element is formed by a poppet of said outlet valve.

26. The valve of claim 25 in which a rod connects said fluid counterbalance to said outlet valve poppet.

27. The valve of claim 19 in which said one seal supported on the outlet valve poppet encloses said first area of the second movable element over which the working pressure is applied for moving said second movable element in said first direction for closing said outlet valve and opening said inlet valve.

28. The valve of claim 27 in which an other of said respective seals enclosing areas of the second movable element encloses said second area of the second movable element over which the working pressure is applied for moving said second movable element in said second direction for opening said outlet valve.

29. The valve of claim 28 in which said second area of the second movable element is less than two rimes larger than said first area of the second movable element for limiting said magnitude of the reactionary force opposing movement of the actuator.

30. The valve of claim 29 in which said first area of the second movable element is equal to said predetermined area of the outlet valve seat.

31. The valve of claim 17 in which said first movable element includes a first area over which the supply pressure is applied for urging said first movable element in said first direction for opening said inlet valve and a second area over which the supply pressure is applied for urging said first movable element in a second direction for closing said inlet valve.

32. The valve of claim 31 in which said first and second areas of the first movable element are related in size for substantially balancing said first movable element against movement imparted by the supply pressure.

33. The valve of claim 32 in which said first and second areas of the first movable element are enclosed by respective seals, one of said respective seals providing for isolating the supply pressure from the working pressure and the other of said respective seals providing for isolating the supply pressure from the exhaust pressure.

34. The valve of claim 33 in which said outlet valve seat is formed by a part of said first movable element for isolating the working pressure from the exhaust pressure.

35. The valve of claim 34 in which one of said seals enclosing areas of the first moving element is supported on a poppet formed by another part of said first movable element for closing said inlet valve.

36. The valve of claim 35 in which said predetermined areas of the inlet and outlet valve seats are related in size for substantially balancing said first movable element against movement imparted by the working pressure.

* * * * *